UNITED STATES PATENT OFFICE.

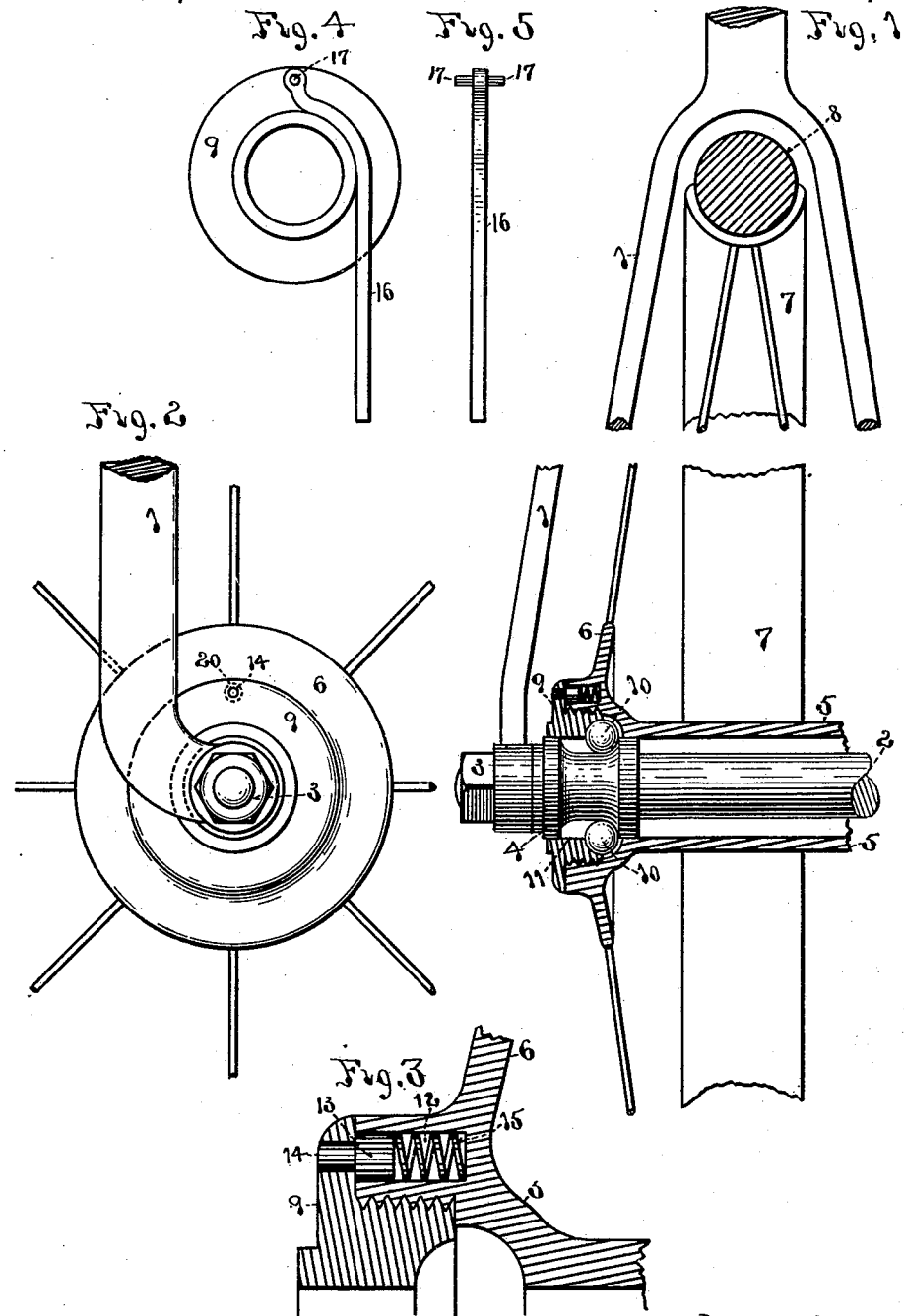

JOHN M. MARLIN, OF NEW HAVEN, CONNECTICUT.

VELOCIPEDE.

SPECIFICATION forming part of Letters Patent No. 400,098, dated March 26, 1889.

Application filed January 21, 1888. Serial No. 261,550. (No model.)

*To all whom it may concern:*

Be it known that I, JOHN M. MARLIN, of New Haven, in the county of New Haven and State of Connecticut, have invented a certain new and useful Improvement in Velocipedes, of which the following is a specification.

My invention relates to velocipedes; and it consists in certain new and useful constructions and combinations of the several parts of the same, substantially as hereinafter described and claimed.

In the drawings, Figure is an elevation from the front side of a portion of the small wheel and fork of a velocipede, showing the wheel in section. Fig. 2 is a side elevation of a portion of Fig. 1, with the wheel part not sectioned. Fig. 3 is a portion of the wheel-hub, as shown in Fig. 1, enlarged to show the parts more clearly. Fig. 4 is an outer end view of the nut of the wheel-hub with the spanner upon it, by which it is unscrewed. Fig. 5 is an edge view of the spanner.

The fork 1 of the small wheel may either be connected to the backbone of a bicycle or attached to the steering-gear of a tricycle. The ends of this fork (one only being shown) are attached to the axle 2 of the wheel by nuts 3 upon the outer ends of the axle, which clamp the fork between them and the shoulders 4 upon the axle. The hub 5 of the wheel has flanges 6 upon its ends to receive the spokes of the wheel. The rim 7 of the wheel holds the rubber tire 8 in place. Within the outer end of the wheel-hub its bore is enlarged and screw-threaded, and a nut, 9, having a corresponding external screw-thread is screwed into the hub until the flange or collar of the nut bears against the outer end of the wheel-hub. This nut is made in the form of a tube fitting around the axle 2, and has a concave internal groove upon its inner end, which embraces the balls 10 10, upon which the wheel runs, and forms the outer part of the ball-bearing. The inner part of the ball-bearing is formed by the concave groove 11 around axle 2. The bearing and balls are held in the relative position shown in Fig. 1 by a suitable ball-bearing at the opposite end of the wheel-hub, which may be either like the one shown upon this end or like that known as an "adjustable" bearing, shown in the patent granted to David Hall Rice, No. 322,482, dated July 21, 1885, or to myself, No. 331,899, dated December 8, 1885.

The construction and operation of all the before-mentioned parts is well known and will be readily understood without further description. There has heretofore, however, been found a difficulty in its use practically.

The nut 9, forming the bearing of the wheel upon the balls 10 10—for the bearing end of the nut upon the balls may be made in a separate annular piece from the main part thereof, if desired—has been found to work loose from the wheel-hub by the running of the wheel backward and forward, causing the nut to unscrew. The unscrewing of the nut disturbs the adjustment of the ball-bearing upon the balls 10, and causes the undue wearing of the balls therein and a liability to split and crack the balls, which are of hardened steel, by the excess of play of the wheel-hub upon them. Moreover, a different size of balls can be employed by locking the nut 9 before it is entirely screwed up to the wheel-hub. To avoid this difficulty, I attach a nut-lock to the wheel-hub by forming a cavity or hole, 12, in its outer face, against which the flange of the nut 9 abuts when the nut is screwed home. Opposite cavity 12, I make a hole, 20, through the flange of nut 9, of less diameter than the cavity. Into the cavity I fit the plunger 13, having a smaller outer end or nose, which fits into this hole 20 in the flange of nut 9, and behind the plunger I place the spiral spring 15. These several parts are so adjusted with relation to each other that the nose 14 of plunger 13 will be forced by spring 15 into its hole in the flange of nut 9 at the time when the flange of the nut bears upon the end of the hub 5, thus locking the nut securely into place.

In order to unscrew the nut, it is only necessary to insert a pin into the hole in the flange, and, pressing it against the nose 14 of the plunger, push the latter inward until the nut is released.

In order to conveniently screw into place and unscrew the nut 9, I employ the spanner 16, which is a curved bar fitting around the nut and having projecting laterally from it at one end the pins 17, either one or two, but preferably with one on each side, as shown. These pins respectively fit into the hole 20 of the nut 9, and each is just long enough to have its end come flush with the inner face of the flange of the nut when inserted into the hole. As long as the spanner is in this position, (shown in Fig. 4,) the nose 14 of plunger 13 is prevented from entering hole 20, and as the hole passes the plunger in screwing and unscrewing the nut the plunger cannot catch in or enter the hole until the nut is screwed home and the spanner removed. In like manner the act of applying the spanner to unscrew the nut unlocks the latter.

The advantages of this nut-lock are its simplicity and ease of operation in attaching and detaching the nut 9, and in affording no projecting parts to interfere with the revolution of the wheel or catch upon anything; also, in enabling the ball-bearing surfaces to receive and be adjusted to balls of different sizes, as hereinbefore described, and thus prevent the nut 9 from being unscrewed and causing the balls to fit too loosely and allow the wheel to rattle upon and break the balls, or to screw up too tightly upon them and bind the balls, causing the bearing to cut and heat, all of which is liable to occur automatically without the use of the nut-lock, as shown.

What I claim as new and of my invention is—

1. The combination of the wheel-hub 5, provided at its end with an internal screw-thread and ball-bearing surface, the tubular nut 9, supporting its internal ball-bearing surface and provided with a corresponding outer screw-thread, and the plunger 13, fitted to opposite holes in the nut and wheel-hub, and arranged by its movement therein to lock and unlock them to and from each other in position to embrace the balls 10, substantially as described.

2. The combination of the axle 2, the wheel-hub 5, provided at its end with an internal screw-thread, the ball-bearing surface, the tubular nut 9, supporting its ball-bearing surface and provided with a corresponding outer screw-thread, and the plunger 13, fitted to opposite holes in the nut and wheel-hub, and arranged by its movement therein to lock and unlock them to and from each other in position to embrace the balls 10, substantially as described.

3. The combination of the fork 1, the axle 2, the wheel-hub 5, provided at its end with an internal screw-thread and ball-bearing surface, the tubular nut 9, supporting its ball-bearing surface and provided with a corresponding outer screw-thread, and the plunger 13, fitted to opposite holes in the nut and wheel-hub and arranged by its movement therein to lock and unlock them to and from each other in position to embrace the balls 10, substantially as described.

4. The combination of the wheel-hub 5, provided at its end with an internal screw-thread and ball-bearing surface, and with cavity 12, the tubular nut 9, provided with corresponding hole, 20, of less diameter than cavity 12, and the plunger 13, fitting cavity 12 and having the nose 14, of less diameter, fitting said hole 20 in the nut, and arranged to enter the same and lock the nut in place, substantially as described.

5. The combination of the wheel-hub 5, provided at its end with an internal screw-thread and ball-bearing surface, and with cavity 12, the tubular nut 9, provided with corresponding hole, 20, of less diameter than cavity 12, and the plunger 13, fitting cavity 12 and having the nose 14, of less diameter, fitting said hole 20 in the nut, and arranged to enter the same and lock the nut in place, and the spring 15, substantially as described.

JOHN M. MARLIN.

Witnesses:
  M. E. WARD,
  J. LAWLOR.